United States Patent [19]

Pandula

[11] Patent Number: 5,640,415
[45] Date of Patent: Jun. 17, 1997

[54] BIT ERROR PERFORMANCE OF A FREQUENCY HOPPING, RADIO COMMUNICATION SYSTEM

[75] Inventor: Louis Pandula, Sunnyvale, Calif.

[73] Assignee: VLSI Technology, Inc., San Jose, Calif.

[21] Appl. No.: 257,968

[22] Filed: Jun. 10, 1994

[51] Int. Cl.$^6$ .................................................. H04B 1/713
[52] U.S. Cl. ........................... 375/202; 375/200; 455/63; 380/34
[58] Field of Search ..................................... 375/202, 200, 375/272, 278, 267, 260, 349; 455/303, 312, 103, 63; 380/34; 370/18, 19

[56] References Cited

U.S. PATENT DOCUMENTS

| | | |
|---|---|---|
| 3,963,988 | 6/1976 | Niethammer . |
| 4,035,728 | 7/1977 | Ishikawa et al. . |
| 4,063,174 | 12/1977 | Gupta et al. . |
| 4,532,636 | 7/1985 | Wilkinson . |
| 4,716,573 | 12/1987 | Bergström et al. ............ 375/202 |
| 4,908,839 | 3/1990 | Morimoto et al. ............ 375/267 |
| 5,245,633 | 9/1993 | Schwartz et al. ............ 375/267 |
| 5,287,543 | 2/1994 | Wolkstein ............ 455/103 |
| 5,345,600 | 9/1994 | Davidson ............ 375/260 |
| 5,479,450 | 12/1995 | Okanoue et al. ............ 375/349 |

FOREIGN PATENT DOCUMENTS

2 239 768  5/1990  United Kingdom .

*Primary Examiner*—Wellington Chin
*Assistant Examiner*—Jean B. Corrielus
*Attorney, Agent, or Firm*—Patrick T. King

[57] ABSTRACT

The technique of redundantly retransmitting digitized voice data on multiple sequential frequencies increases the channel bit rate above the minimum required for normal communication in a frequency-hopping communication system for digitized voice signals. Digitized voice data is redundantly retransmitted on multiple sequential frequencies and the channel bit rate is increased above the minimum required for normal communication. Repeated transmissions of the same block of digitized voice data occurs n times at n times the bit rate of the original digitized voice data. A frequency-hopping transmitter transmits on different channels, or carrier frequencies, which are modulated by the digitized voice data signals from a transmitter data buffer. A receiver data buffer holds n blocks of digitized voice data. A signal quality estimator estimates which of the n blocks of digitized voice data has a desirable signal quality and selects the block of digitized voice data having the desirable signal quality at an output terminal of the system.

20 Claims, 4 Drawing Sheets

BIT ERROR PERFORMANCE OF A FREQUENCY HOPPING, RADIO COMMUNICATION SYSTEM

BACKGROUND OF THE INVENTION

1. Field of the Invention.

This invention relates to frequency-hopping communication systems for wireless data communication of digitized voice signals.

2. Prior Art.

The use of frequency-hopping radio systems for wireless data communication has become prevalent because of the FCC rules governing unlicensed operation in the Industrial, Scientific, and Medical (ISM) bands. Unfortunately, because of the loosely regulated nature of these bands, there is a high likelihood that radio systems operating in these ISM bands will interfere with each other. Interference from other radio systems operating in these bands along with various other transmission impairments, such as multipath fading, make it difficult for these radio systems to obtain bit error rates that are low enough to provide useful communication services, particularly for digital transmission of voice signals.

One technique for overcoming these shortcomings for the ISM bands for asynchronous data traffic is an Automatic Retry Request (ARQ) error correction technique. With ARQ, the data information to be sent from a source transmitter to a destination receiver is broken up into smaller packets. Each of these smaller data packets is then sent from the source to the destination over a single radio-frequency channel. If an entire data packet is received correctly by the destination, the destination sends a positive acknowledgment signal back to the source. The source then sends the next data packet on a different radio channel and the acknowledgment process is repeated. If the destination receives a data packet with errors, the destination can either not reply with an acknowledgment signal or reply with a negative acknowledgment signal. In either case, the source then retransmits the data packet that was received in error on yet another radio frequency. This process is repeated until a data packet is received without errors and the source receives a positive acknowledgment.

With this ARQ retransmission/acknowledgment technique, all of the data packets comprising the original information are sent as many times as is necessary for error free reception. Note that, while the ARQ technique provides very low error rates, the ARQ technique cannot guarantee the maximum amount of time required to send the information correctly.

For digital transmission of voice signals, much higher error rates can be tolerated than those required for the reliable transmission of data. However, transmission of voice signals require that the communication channel guarantee a minimum information throughput and a maximum amount of delay time. The voice signals must be sent in near-real time without any major interruptions or time gaps to provide intelligible and satisfactory reproduction of the voice signals.

SUMMARY OF THE INVENTION

An object of this invention is to improve the bit error performance of a frequency hopping, radio communication system which is used for the transmission of digitized voice data.

In accordance with this and other objects of the invention, a frequency-hopping communication system and method is provided for digitized voice signals. The system includes means for redundantly retransmitting digitized voice data on multiple sequential frequencies and means for increasing the channel bit rate above the minimum required for normal communication. The invention takes advantage of this redundant retransmission of digitized voice data on multiple sequential frequencies and increasing the channel bit rate above the minimum required for normal communication to provide improved bit error performance, guaranteed data throughput.

The frequency-hopping communication system for digitized voice signals includes transmission means for repeatedly transmitting the same block of digitized voice data n times at n times the certain bit rate where each transmission of the same block of digitized voice data is transmitted on a different carrier frequency. The transmission means includes a frequency-hopping transmitter, which transmits on the different channels, or carrier frequencies, which are modulated by the digitized voice data signals from a transmitter data buffer. A receiver data buffer means holds n blocks of digitized voice data from a frequency-hopping receiver. A signal quality estimator means is provided for estimating which of the n blocks of digitized voice data has a desirable signal quality. Means are included for providing the block of digitized voice data having the desirable signal quality at an output terminal of the system.

A frequency-hopping radio communication system for transmitting and receiving digitized voice signals according to the invention includes transmitter data buffer means for collecting a block of digitized voice data, which has a certain original bit rate. Transmission means are provided for repeatedly transmitting the same block of digitized voice data n times at n times the original bit rate. Each transmission of the same block of digitized voice data is transmitted on a different carrier frequency using a frequency-hopping transmitter. The transmitter transmits on different predetermined carrier frequencies and is modulated by the digitized voice data signals from the transmitter data buffer means.

A receiver receives the signals transmitted from the frequency-hopping transmitter. A transmitter frequency selector provides the carrier frequency signals to the frequency-hopping transmitter and a receiver frequency selector provides receiver frequency signals to the frequency-hopping receiver for receiving and demodulating the output transmitted signals from the frequency-hopping transmitter. A multiplexed receiver data buffer holds n blocks of digitized voice data from the frequency-hopping receiver. A signal quality estimator estimates which of the n blocks of digitized voice data has the best signal quality. The block of digitized voice data having the best signal quality is provided at an output terminal of the system.

In one embodiment of the invention, the multiplexed receiver data buffer includes an input switch having an input terminal and a plurality of output terminals, wherein each output terminal of the input switch means is connected respectively to an input terminal of a data buffer. The multiplexed receiver data buffer also includes an output switch having an output terminal and a plurality of input terminals, wherein each input terminal of the output switch means is connected respectively to an output terminal of a data buffer.

The multiplexed receiver data buffer also includes an input switch having an input terminal and two output terminals, wherein each of the two output terminals of the input switch means is connected respectively to an input terminal of a data buffer means. The multiplexed receiver data buffer includes an output switch having an output terminal and a two input terminals, wherein each input terminal of the two output switch means is connected respectively to an output terminal of a data buffer.

In another embodiment of the invention, the signal quality estimator includes means for determining when the receiver means receives an uncorrupted block of digitized voice data and means for transmitting each block of digitized voice data as many times as are necessary to provide an acceptable quality for a received block of digitized voice signals as long as the number of retransmissions does not exceed the increase in the channel bit rate. Means are provided for notifying the transmitter to discontinue further retransmissions of the same block of digitized voice data and for the transmitter to remain idle until it is time to transmit the next block of digitized voice signals.

The signal quality estimator means includes error detection means such as parity detection means or means for measuring the quality of a signal received by the receiver means such as edge-jitter measuring means.

A method of communicating digitized voice signals through a frequency-hopping radio system is provided. In its broad aspects, the method includes the steps of increasing the channel bit rate by a factor of n above the minimum required for normal communication and redundantly transmitting a block of digitized voice data at an n times bit rate on multiple sequential frequencies.

The invention includes a method of communicating digitized voice signals over a frequency hopping communication system. The method includes the steps off repeatedly transmitting the same block of digitized voice data n times at n times the original bit rate of the digitized voice data, where each transmission of the same block of digitized voice data is transmitted on a different carrier frequency; receiving the output transmitted signals from the frequency-hopping transmitter; holding n blocks of digitized voice data from the frequency-hopping receiver in a receiver data buffer; estimating which of the n blocks of digitized voice data has a desirable signal quality; and selecting and providing the block of digitized voice data having the desirable signal quality at an output terminal of the system.

A more detailed method for transmitting and receiving digitized voice signals in a frequency-hopping radio communication system includes collecting a block of digitized voice data in a transmitter data buffer, where said digitized voice data has a certain bit rate. The method also includes repeatedly transmitting the same block of digitized voice data n times at n times the certain bit rate where each transmission of the same block of digitized voice data is transmitted on a different carrier frequency, where said transmission means includes a frequency-hopping transmitter, which transmits on the different predetermined carrier frequencies and which is modulated by the digitized voice data signals from the transmitter data buffer means, and which provides output transmitted signals.

The method includes providing the predetermined carrier frequency signals to the frequency-hopping transmitter with a transmitter frequency selector as well as providing predetermined frequency signals to the frequency-hopping receiver for receiving and demodulating the output transmitted signals from the frequency-hopping transmitter with a receiver frequency selector synchronized to the transmitter frequency selector.

The method also includes holding n blocks of digitized voice data from the frequency-hopping receiver, estimating which of the n blocks of digitized voice data has the best signal quality, and providing the block of digitized voice data having the best signal quality at an output terminal of the system.

The step of holding n blocks of digitized voice data from the frequency-hopping receiver includes the step of switchably connecting data buffers to the output terminal of the frequency-hopping receiver and the step of switchably connecting one of two data buffers to the output terminal of the frequency hopping receiver and the step of selecting the block of digitized voice data having the best signal quality.

The method includes the steps of determining when the receiver means receives an uncorrupted block of digitized voice data; transmitting each block of digitized voice data as many times as are necessary to provide an acceptable quality for a received block of digitized voice signals as long as the number of retransmissions does not exceed the increase in the channel bit rate, and notifying the transmission means to discontinue further retransmissions of the same block of digitized voice data and for the transmission means to remain idle until it is time to transmit the next block of digitized voice signals.

The step of estimating which of the n blocks of digitized voice data has the best signal quality includes detecting errors in a received block of data. The step of detecting errors includes detecting parity errors or measuring the quality of a signal received by the receiver means, including measuring edge jitter.

Much greater power can be used with a frequency-hopping, spread-spectrum system according to the invention. This is important in this type of service where transmitters are uncoordinated and the service is basically limited in its performance by interference from other users. The FCC has set rules which permit one watt of power for spread spectrum, i.e., frequency hopping, in the ISM bands at 902–908 MHz and 2.4–2.483 GHz, etc. while only one milliwatt of power can be used for standard transmissions, without spread spectrum.

The reduction in bit error rate provided by the invention allows the system to operate with good voice quality in the presence of radio interference and multipath fading.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
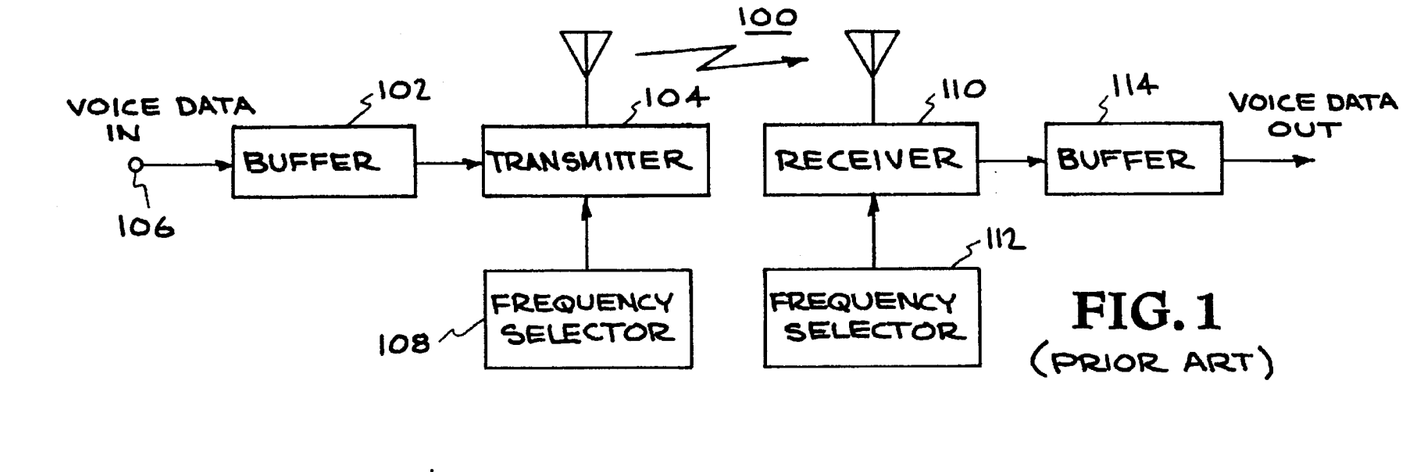
FIG. 1 is a block diagram of a prior-art frequency-hopping radio system for voice communication which sends a block of data only once.

FIG. 1 is a block diagram of a prior-art frequency-hopping radio system 100 for sending and receiving digitized voice communications. For transmission over a frequency-hopping radio system, a digitized voice signal is typically broken down into a number of relatively short time segments. For each time segment, a block of voice data is collected in a data buffer 102 and then transmitted on a single radio frequency from a transmitter 106 while the next block of voice data is being collected in the data buffer 102. Input voice data is received at an input terminal 106 of the data buffer 102, which holds one block of digitized voice data. The output signals of the data buffer 102 are fed into the input terminals of a transmitter 104, which is modulated on a carrier frequency by the data signals. The carrier frequencies for the transmitter 104 are provided by a carrier frequency selector circuit 108, which includes, for example, a frequency synthesizer which provides a particular carrier frequency for the length of one block of voice data. The carrier frequencies are periodically changed in a pseudo random pattern to provide frequency-hopping for the system.

Figure 2:
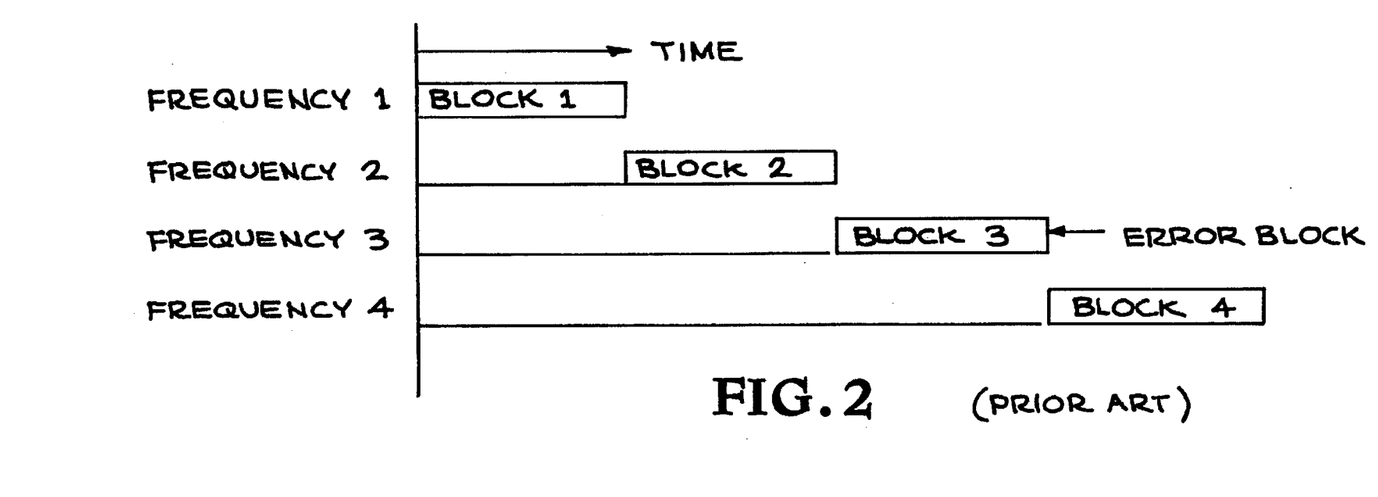
FIG. 2 illustrates the use of different transmitter frequencies with the frequency-hopping radio system of FIG. 1, where each frequency handles a different block of data.

FIG. 2 illustrates the use of a different transmitter frequency for each block of data.

Referring to FIG. 1, the transmitted signal from the transmitter 104 is received and demodulated by a receiver circuit 110, which is tuned to an appropriate received carrier frequency with a receiver frequency selector circuit 112. The frequencies of the receiver frequency selector circuit 112 are coordinated with the transmitter frequencies according to a conventional frequency-hopping protocol which includes acquisition and maintenance of frequency and timing synchronization. The received data signals are stored in a receiver buffer 114. The signals from the buffer 114 are fed out as the digital voice output signals. The receiver circuit accepts each block of voice data without correction or alteration. As long as severe interference is not present in the link between the transmitter and the receiver so that the radio signal at the destination is received intact, the bit error rate for the received data signals remains low enough to provide faithful reproduction of the original voice signal. A block of voice data whose bit error rate is higher than what is required for good voice intelligibility is defined as a corrupted block of voice data.

Referring to FIG. 2, Block 3 of data is designated as having errors, which are caused by degraded transmission conditions, such as channel interference from other users within the frequency band. If errors occur in the course of transmission, the reproduced voice at the destination receiver is degraded. For ADPCM (Adaptive Differential Pulse Code Modulation) encoded voice at 32 kilobits per second, the effects of data error rates below 0.1% are unnoticeable in the reproduced voice signals. Data error rates as high as 1% still provide for intelligible speech reproduction.

The invention includes blocking the digitized voice data bits, repeating a block n times, and estimating the signal quality of each block of bits.

The following example is used to illustrate the effect of channel interference on error rates for the prior art system described in connection with FIG. 1. A frequency hopping radio operates on 208 different carrier frequencies. The order in which the frequencies are selected is determined by an appropriately provided pseudo-random list. Once all of the frequencies in the list have been used once, the list is repeated or another list with a different ordering of the same frequencies may be used. The voice data is broken up into short, equal length blocks with each block sent on one of the 208 frequencies. Assume that signals on 12 of the 208 frequencies are corrupted by interference and that the corresponding blocks of voice data are in error. Since 12 out of 208 blocks are received with errors, a block error rate of 5.8% results. If no means of error correction is provided for the bits within an erroneous block, the bit error rate for all of the bits within that block is also 5.8%. This bit error rate is too high to provide useful voice communication.

From the simple example above, it is apparent that a relatively small number of corrupted frequencies can have a significant effect on the ability of this prior art frequency-hopping system to provide intelligible voice communication.

Figure 3:
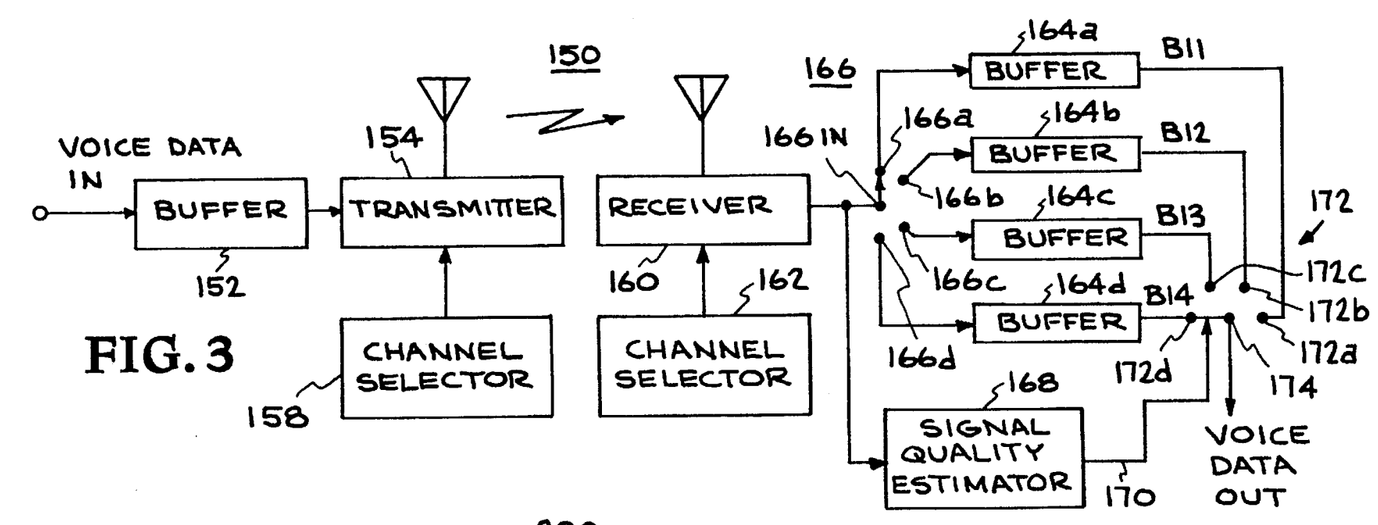
FIG. 3 is a block diagram of a frequency-hopping radio system for voice communication according to the invention.

FIG. 3 is a block diagram of an improved frequency-hopping radio system 150 for sending and receiving digitized voice communications according to the invention. The digitized voice signal is organized into a number of relatively short time segments, called blocks. For example, a block of ten bits has a one millisecond period with each data bit having a 10 kilobit data rate. Each block of voice data is collected in a transmitter data buffer 152. In this system, a block of voice data collected in the transmitter data buffer is transmitted n times by a frequency hopping transmitter 154 using its associated channel frequency selector 158. The bit rate for the transmitted data is n times the data rate of the original digitized voice signals. While ten bits per block is described for illustration purposes, block lengths typically are on the order of one to several hundred bits in length. Blocks may also include error detection and correction bits.

The channel bit rate for this improved frequency-hopping system is increased by an integer multiple factor above the data rate for the voice information and any system overhead data bits. A factor of four is used in this illustrative example. This increases the channel bit rate by a factor of four and sends each block in a fraction of the time normally required. Each block of digitized voice data is sequentially transmitted on four different channels. A transmitter channel for a multiply-transmitted block of digitized voice information according to the invention requires an increased bandwidth to support the higher channel bit rate. The bandwidth of a channel now covers the band occupied by four frequencies for a conventional frequency hopping system such as described in connection with FIG. 1.

The F.C.C. permits one watt of power for spread spectrum, i.e., frequency hopping, in the ISM bands at 902–908 MHz, 2.4–2.483 GHz, and other bands. Only one milliwatt of power can be used for standard transmissions, without spread spectrum or frequency hopping. Much greater power can be used with a frequency-hopping, spread-spectrum system according to the invention. This is important in this type of service where transmitters are uncoordinated and the service is basically limited in its performance by interference from other users.

Data from the transmitter data buffer 152 is sequentially transmitted on the four different channels, while the next block of voice data is simultaneously being collected in the data buffer 152. The data buffer 152 is designed so that the contents of the data buffer 152 are transmitted four times at the higher rate while new input data for a subsequent block of digitized voice data at the lower data rate is being collected in the data buffer.

The output signals of the data buffer 152 are fed into the input terminals of the transmitter 154 and modulated onto the four sequentially provided carrier frequencies. The four different carrier frequencies for the transmitter 154 are provided by the carrier frequency selector circuit 158. The carrier frequency selector includes, for example, a frequency synthesizer which sequentially provides the four carrier frequencies for each block of data. The carrier frequencies are periodically changed in a predetermined pseudo-random pattern to provide frequency-hopping.

Figure 4:
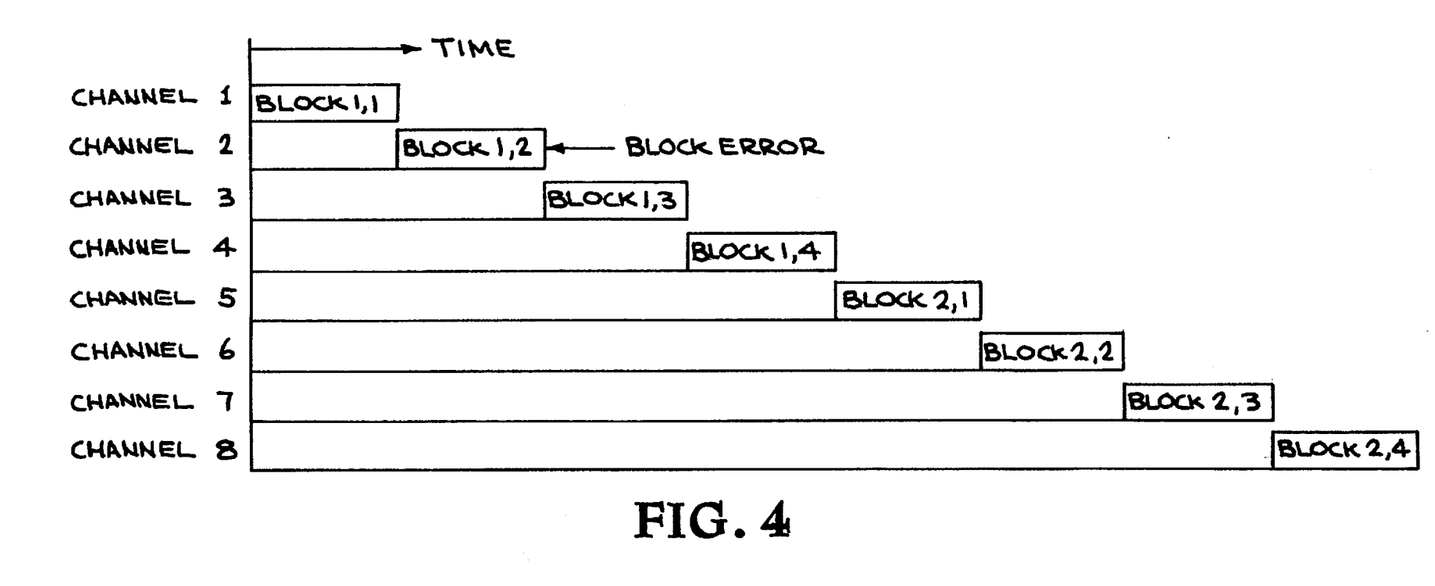
FIG. 4 illustrates a number of frequencies used with the frequency-hopping radio system of FIG. 3, where each frequency handles one block of data.

FIG. 4 diagrammatically illustrates the assignment of four transmitter channels to each repeated data block for the frequency-hopping radio system of FIG. 3.

For this example, Channels 1 through 4 sequentially transmit the same block of digitized voice data $B_1$, which is identified in the Figure as $B_{1,1}$ for Channel 1, $B_{1,2}$ for Channel 2, $B_{1,3}$ for channel 3, and $B_{1,4}$ for Channel 4. Block $_{1,2}$ is illustrated as having errors. Similarly, Channels 5 through 8 sequentially transmit another block of digitized voice data $B_2$, which is identified in the Figure as $B_{2,1}$ for Channel 5, $B_{2,2}$ for Channel 6, $B_{2,3}$ for channel 7, and $B_{2,4}$ for Channel 8.

Referring back to FIG. 3, the transmitted signal from the transmitter 154 is received and demodulated by a receiver circuit 160, which is tuned to an appropriate received carrier frequency with a receiver frequency selector circuit 162. The frequencies of the receiver frequency selector circuit 162 are coordinated with the transmitter frequencies according to a frequency-hopping protocol.

The received data information for each sequentially transmitted block are respectively stored in a parallel receiver buffer arrangement 164, which includes four buffers 164a, 164b, 164c, 164d each of which has a length of 1 block of digitized voice data. An input selection switch 166 has an input terminal $166_{in}$ and four output terminals 166a, 166b, 166c, 166d. The switch is operated in synchronization with the channel selector 162 so that the input terminal 166in is connected to a respective output terminal 164a, 164b, 164c, 164d. In this manner, the data block $B_{1,1}$ is fed into the buffer 164a; the data block $B_{1,2}$ is fed into the buffer 164b; the data block $B_{1,3}$ is fed into the buffer 164c; and the data block $B_{1,4}$ is fed into the buffer 164d.

The receiver 160 receives the four redundant copies of each block of digitized voice data. A signal quality estimator circuit 168 is connected to the output terminal of the receiver 160. The signal quality estimator circuit 168 determines which of the four received blocks of digitized voice data has the fewest impairments and selects that block and, in effect, discards those blocks that have been corrupted. The selection operation is performed by the signal quality estimator 168 which provides an output control signal indicative thereof on control line 170. A buffer output selection switch 172 has four input terminals: terminal 172a is connected to the output terminals of buffer 164a for block $B_{1,1}$, terminal 172b is connected to the output terminals of buffer 164b for block $B_{1,2}$, terminal 172c is connected to the output terminals of buffer 164c for block $B_{1,3}$, and terminal 172d is connected to the output terminals of buffer 164d for block $B_{1,4}$. The output control signal of the signal quality estimator 168 on control line 170 selects one of the input terminals of the switch 172 to be connected to an output terminal 174. Terminal 174 provides the best block of voice data information to a user. As long as one copy of each block of digitized voice data is received with minimal impairment, this system provides sufficiently low bit error rates even in the presence of interference.

The signal quality estimator can be implemented in a number of ways. For example, each of the voice data blocks can include extra parity or error detection bits. The demodulated data bits can also be monitored for edge jitter to provide a signal indicative of the quality of the received voice data.

Figure 5:
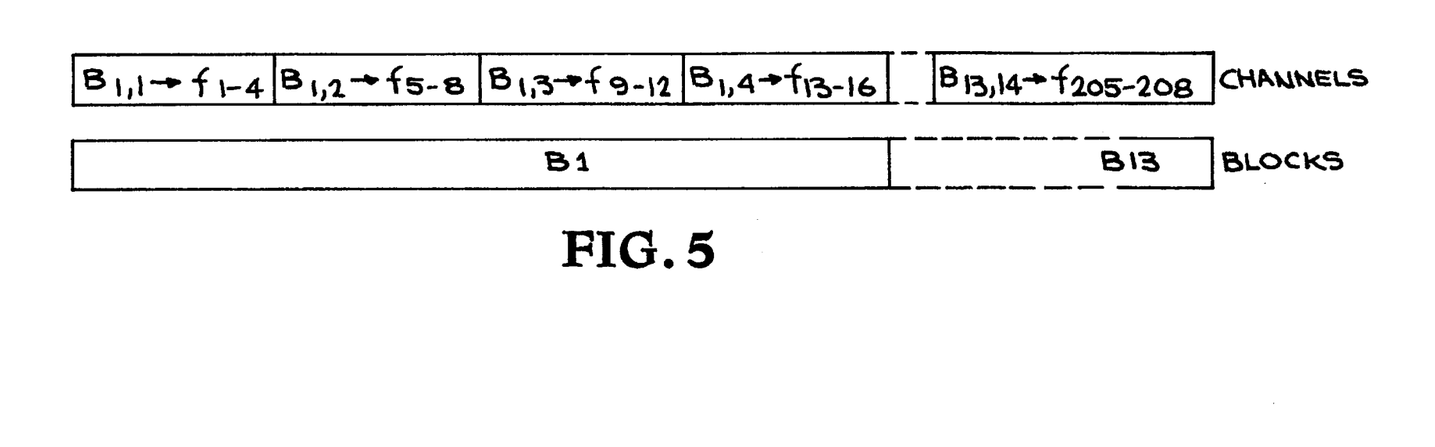
FIG. 5 illustrates the organization structure for frequencies, channels, and groups.

FIG. 5 illustrates the retransmissions of Block B1 by Channels $B_{11}$, $B_{12}$, $B_{13}$, $B_{14}$. Input Block B1 has a time period of 1 millisecond and has 10 data bits at an input bit rate of 10 kbits/sec. Each time-compressed channel sends the same number of bits as an input block but has a higher bit rate of 40 kbits/sec. A block of input data is repeated four times in one millisecond.

Because the channel bit rate is increased by a factor of four, this requires four times the transmission bandwidth for the retransmissions of the bits for each block. Thus, the retransmission of each block of data at the higher bit rate now requires a transmission bandwidth which includes the four narrower frequency bands associated with the original transmission frequencies for the lower bit rate prior art system. For example, frequencies f1 through f4 are within Channel B11, which occupies a bandwidth covering frequencies f1, f2, f3, f4. Four of the channels are organized to send a block of the original data four times.

If the original system uses 208 different frequencies, which are distributed over a service band, the bandwidth allocated for these frequencies will provide 52 channels for a time-compressed, retransmission system according to the invention. For a retransmission system according to the invention, each block of input data uses 4 channels covering 16 of the original frequency bands, so that 13 blocks of data can be retransmitted using the frequency bandwidths allocated for the 208 different frequencies of the service bandwidth. Each channel has a bandwidth covering 4 of the original frequencies used in the prior art system. If certain ones of the 208 frequency bands are corrupted by interference, we assume that the digitized voice data transmitted through a channel encompassing one of these corrupted frequencies will be in error and not useful for reproduction of a voice signal. The bandwidths associated with each of these 208 frequencies is periodically used by frequency hopping systems. A frame of data is one block of original data. A block of digitized voice signals may include, if appropriate, parity/error detection bits or other system overhead bits.

The performance improvement achievable using the invention is illustrated with numerical examples which compare the original "uncorrected" block error rate of the prior art system of FIG. 1 with the "corrected" block error rate of a system according to the present invention. A block is defined as having, for example, ten bits. The total block error rate is equal to the sum of the error rates for one, two, three, etc. blocks in error. The combinations for two or more blocks being in error are less than for just one block in error.

If 4 frequency bands are corrupted:

The uncorrected block error rate=

$$\frac{4}{208} = 1.9 \times 10^{-2}$$

The corrected block error rate=

$$\frac{1}{\frac{208!}{4!(208-4)!}} \times 256 \times 13 \times \frac{1}{3} = 3.4 \times 10^{-6}$$

If 8 frequency bands are corrupted:
The uncorrected block error rate=

$$\frac{8}{208} = 3.9 \times 10^{-2}$$

The corrected block error rate for 2 blocks in error=

$$\frac{1}{\frac{208!}{8!(208-8)!}} \times 256^2 \times \frac{13!}{2!(13-2)!} \times \frac{1}{13} \times 2 = 1 \times 10^{-8}$$

The corrected block error rate for 1 block in error=

$$\frac{1}{\frac{208!}{8!(208-8)!}} \times 256 \times$$

$$\left( \frac{204!}{4!(204-4)!} - 256.12 \right) \times 13 \times \frac{1}{13} = 2.36 \times 10^{-4}$$

If 12 frequency bands are corrupted:
The uncorrected block error rate=$5.8 \times 10^{-2}$
The corrected block error rate for 3 blocks in error=:

$$\frac{1}{\frac{208!}{12!(208-12)!}} \times (256)^3 \times \frac{13!}{3!(13-3)!} \times \frac{1}{13} \times 3 = 1 \times 10^{-10}$$

The corrected block error rate for 2 blocks in error=

$$\frac{1}{\frac{208!}{12!(208-12)!}} \times (256)^3 \times \frac{13!}{3!(13-3)!} \times \frac{1}{13} \times 3 = 5.1 \times 10^{-6}$$

The corrected block error rate for 1 block in error=

$$\frac{1}{\frac{208!}{12!(208-12)!}} \times 256 \times$$

$$\left( \frac{204!}{8!(204-8)!} - \left( 256 \left( \frac{200!}{4!(200-4)!} - 256.11 \right) \right) \right) \times$$

$$12 - (256)^2 \times \frac{12!}{2!(12-2)!)} \times 12 \times \frac{1}{13} = 1.5 \times 10^{-3}$$

Under conditions where a conventional system would provide voice quality where the reproduced voice signal is barely intelligible, the present invention provides voice quality which is close to that available with a conventional system without any channel impairments.

Figure 6:
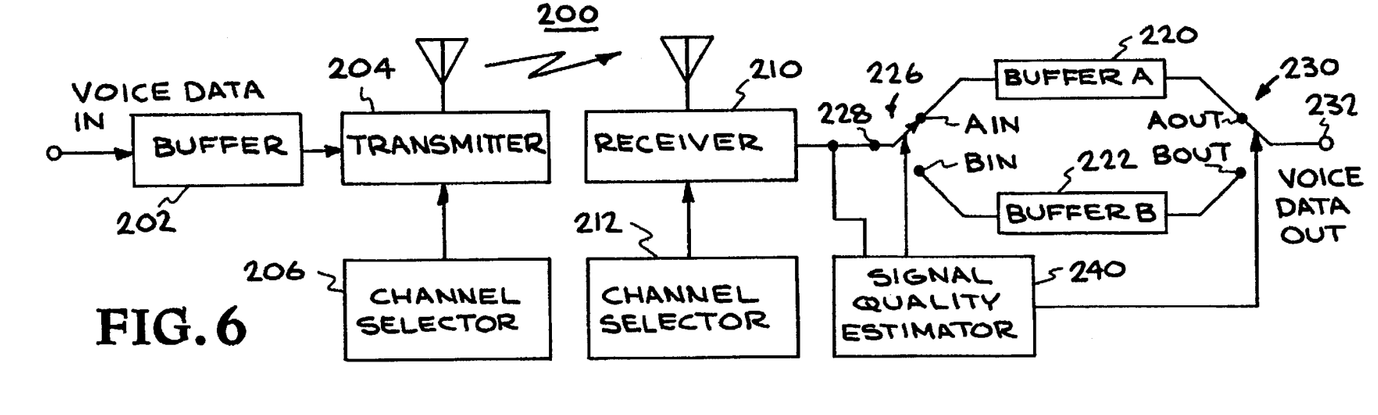
FIG. 6 is a block diagram of an alternative embodiment of a frequency-hopping radio system for voice communication according to the invention.

FIG. 6 is a block diagram of an alternative embodiment of a frequency-hopping radio system 200 for voice communication according to the invention. In this embodiment block retransmission of a block of data occurs using several different frequencies in a manner similar to that described in connection with FIG. 3 herein above.

As previously described, a digitized voice signal is broken down into a number of relatively short time segments and collected in blocks. For each time segment, a block of voice data is collected in a transmitter data buffer 202. The block of voice data in the transmitter data buffer 202 is transmitted a number of times at an integer multiple of the bit rate by a frequency hopping transmitter 204 using its associated channel frequency selector 206.

The repeated transmission of the block of data occurs in the same amount of time that is available for collection of information in the data block. The channel bit rate is increased by an integer multiple factor above the data rate for the voice information and any system overhead data bits. A factor of four is used in this illustrative example. This increase in the channel bit rate by a factor of four, for example, sends each block to be sent in a fraction of the time normally required. Each block of digitized voice data is sequentially transmitted on four different channel frequencies. A transmitter channel for a multiply-transmitted block of digitized voice information now includes four different frequencies and requires an increased bandwidth to support the higher channel bit rate.

The transmitted signal from transmitter 204 is received and demodulated by a receiver circuit 210, which is tuned to an appropriate received carrier frequency with a receiver frequency selector circuit 212. The frequencies of the receiver frequency selector circuit 212 are coordinated with the transmitter frequencies according to a predetermined frequency-hopping protocol.

The received data information for each sequentially transmitted block are stored in a set of receiver buffers, which includes Buffer A 220 and Buffer B 222 each of which has a length of 1 block of digitized voice data. A buffer input selection switch 226 has an input terminal 228 connected to the output terminal of the receiver 210. The buffer input selection switch 226 has two output terminals $A_{in}$, $B_{in}$. Terminal $A_{in}$ is connected to the input terminal of Buffer A 220. Terminal $B_{in}$ is connected to the input terminal of Buffer B 222.

An output selection switch 230 has two input terminals $A_{out}$, $B_{out}$. Terminal $A_{out}$ is connected to the output terminal of Buffer A 220. Terminal $B_{out}$ is connected to the output terminal of Buffer B 222. The output terminal 232 of the switch 230 provides voice data out to a user.

The switch 226 is controlled by a control signal provided from a signal quality estimator circuit 240 on a signal line 242. The switch 230 is controlled by a control signal provided from the signal quality estimator circuit 240 on a signal line 244. The signal quality estimator circuit 240 has its input terminal connected to the output terminal of the receiver 210. The signal quality estimator circuit 240 determines the quality of the signal received for a given frequency and provides the control signals to the switches 226, 230.

FIG. 4 diagrammatically also illustrates a channels which can also be used with the frequency-hopping radio system of FIG. 6. For this example, Channels 1 through 4 sequentially transmit the same block of digitized voice data, which is identified in the Figure as $B_{11}$ for Channel 1, $B_{12}$ for Channel 2, $B_{13}$ for channel 3, and $B_{14}$ for Channel 4. Block $_{12}$ is identified as having errors.

Referring to FIG. 6, the signal quality estimator circuit 240 operates as follows: When block $B_{11}$ is being received, the switches are in positions $A_{in}/A_{out}$. When block $B_{12}$ is being received, the switches are in positions $B_{in}/B_{out}$. When block $B_{13}$ is being received, the switches are set to positions $A_{in}/A_{out}$ if the quality of the signal for the contents of Buffer A is less than the quality of the signal for the contents of Buffer B, otherwise the switches are in positions $B_{in}/B_{out}$. When block $B_{14}$ is being received, the switches are set to positions $A_{in}/A_{out}$ if the quality of the signal for the contents of Buffer A is less than the quality of the signal for the contents of Buffer B, otherwise the switches are in positions $B_{in}/B_{out}$. The switches are operated in synchronization with the channel selector 212. The frequencies of the receiver frequency selector circuit 112 are coordinated with the transmitter frequencies according to a frequency-hopping protocol.

Figure 7:
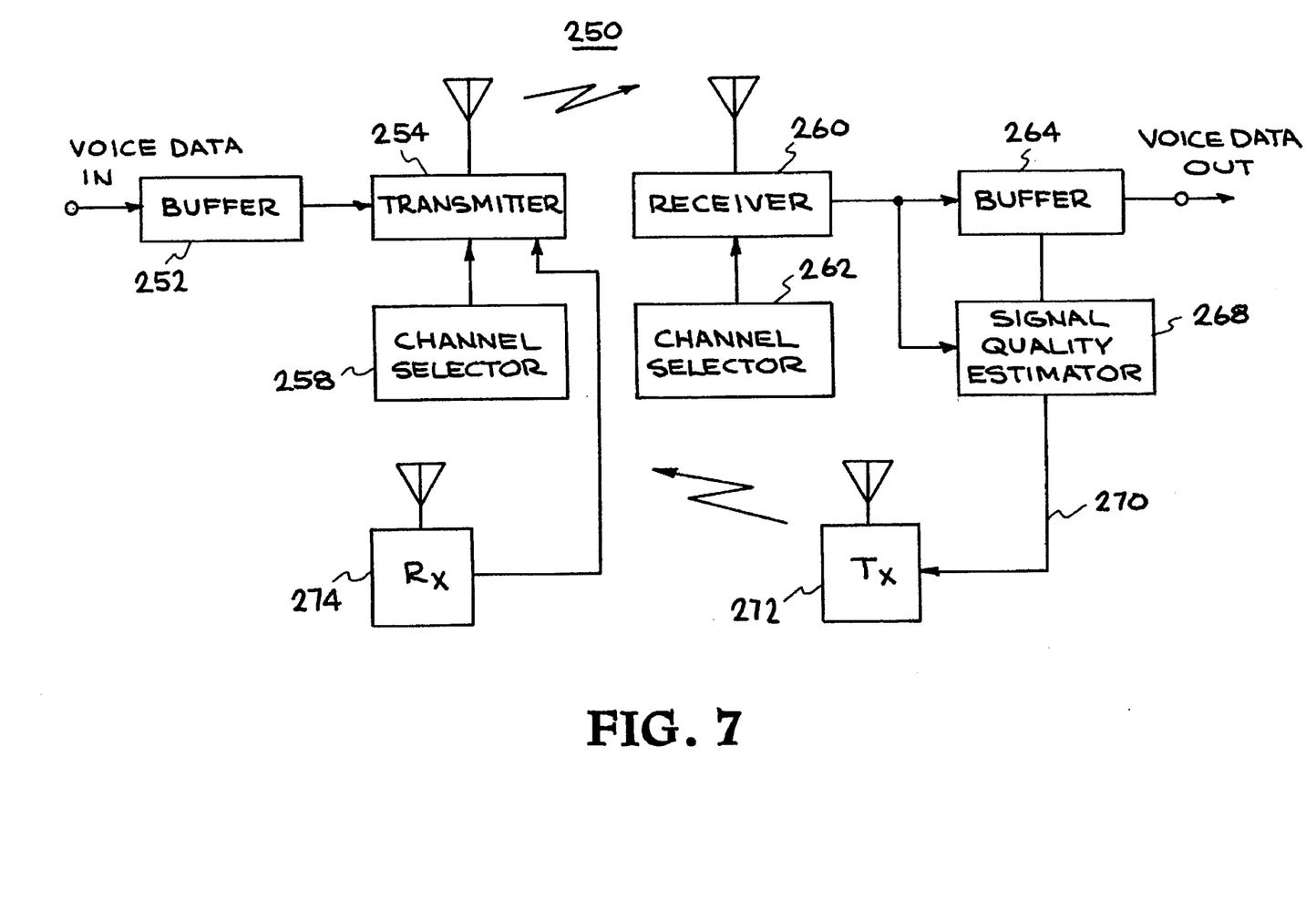
FIG. 7 is a block diagram of another alternative embodiment of a frequency-hopping radio system.

FIG. 7 shows another embodiment of a system 250 according to the invention. The system is another improved frequency-hopping radio system 250 for sending and receiving digitized voice communications according to the invention. This system is implemented in a duplex system which provides time division multiplexing TDM for transmit and receive functions from the same site. The digitized voice signal is organized into block of ten bits and has a one millisecond period with each data bit having a 10 kilobit data rate. Each block of voice data is collected in a transmitter data buffer 252. A block of voice data collected in the transmitter data buffer 252 is transmitted n times by a frequency hopping transmitter 254 using its associated channel frequency selector 258. The bit rate for the transmitted data is n times the data rate of the original digitized voice signals. Each block of digitized voice data is sequentially transmitted in four different channels to accommodate the increased bandwidth required to support the higher channel bit rate according to the invention.

Data from the transmitter data buffer 252 is sequentially transmitted on multiple radio frequencies from the transmitter 154, while the next block of voice data is simultaneously being collected in the data buffer 152. The data buffer 252 is designed so that the contents of the data buffer 252 are transmitted four times at the higher rate while new input data for a subsequent block of digitized voice data at the lower data rate is being collected in the data buffer.

The output signals of the data buffer 252 are fed into the input terminals of the transmitter 254 and modulated onto the four carrier frequencies for each channel. The four different carrier frequencies for the transmitter 254 are provided by the carrier frequency selector circuit 258. The carrier frequency selector includes, for example, a frequency synthesizer which sequentially provides the four different channel frequencies for each block of data. The carrier frequencies are periodically changed in a predetermined pseudo-random pattern to provide frequency-hopping.

The transmitted signal from the transmitter 254 is received and demodulated by a receiver circuit 260, which is tuned to an appropriate received channel frequency with a receiver frequency selector circuit 262. The frequencies of the receiver frequency selector circuit 262 are coordinated with the transmitter frequencies according to a frequency-hopping protocol.

The received data information for each sequentially transmitted block are stored in a receiver buffer arrangement 264 which has a length of 1 block of digitized voice data. The receiver 260 receives a block of digitized voice data. A signal quality estimator circuit 268 is connected to the output terminal of the receiver 260. The signal quality estimator circuit 268 determines that a received block of digitized voice data has minimal impairments. An output control signal from the signal quality estimator 268 on control line 270 indicates that a received block of data is acceptable.

In this embodiment of the invention, the destination signal quality estimator 268 sends a positive acknowledgment signal on a control line 272 to the source transmitter 254. The positive acknowledgment signal is provided when the output control signal from the signal quality estimator 268 is present on control line 270. A communication link for this acknowledgment process is provided by a transmitter 272 and receiver 274. Upon receipt of a control signal on line 272, the source transmitter 254 discontinues further retransmissions of the same block and remains idle until it is time to transmit the next new input block of digitized voice signals from buffer 252. Each block is sent as many times as are necessary, up to n times, to provide an error-free, or minimally impaired, received block of digitized voice signals. This system is effective as long as the number of retransmissions does not exceed n. A benefit of this approach is that the radio system transmits a smaller percentage of the time when it encounters little interference and thus it creates less interference to other systems sharing the same frequencies.

The performance of the invention can be further improved by selecting the channel frequencies using long pseudo random lists. If short lists are used, continuous interference in a particular channel can result in block errors that are periodic in nature. In effect, the block errors repeat at the period of the frequency list. Even if the fundamental frequency corresponding to this period is not in the audible frequency range, its harmonics may have sufficient power to generate considerable audible noise. Because this type of noise manifests itself as tones, or signals with constant frequencies, it is more objectionable to the listener than a spectrally smooth white noise of equal power. Pseudo random lists with very long repetition times, on the other hand, cause block errors to appear more random in nature. The fundamental frequency corresponding to this very long period is low enough in frequency that its harmonics are so closely spaced that they resemble white noise and thus are less noticeable to the listener.

The invention is practiced using conventional circuit elements interconnected and cooperating as described herein above. Alternatively, this invention is also practiced using digital signal processing DSP techniques with hardware such as provided by a general purpose integrated digital signal processor programmed to perform the functions described herein above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

In the claims:

1. A frequency-hopping communication system for digitized voice signals, comprising:

means for repeatedly retransmitting n times a block of digitized voice data on multiple sequential frequencies at n times the original bit rate of the digitized voice data;

means for estimating at a frequency hopping receiver the signal quality of each retransmitted block of digitized voice data;

multiplexed receiver data buffer means for holding n blocks of digitized voice data from the frequency-hopping receiver; and means for selecting the retransmitted block having the best quality.

2. A frequency-hopping communication system for digitized voice signals, comprising:

transmission means for repeatedly retransmitting the same block of digitized voice data n times at an increased bit rate over the original block bit rate where each transmission of the same block of digitized voice data is retransmitted on a different carrier frequency, and where said transmission means includes a frequency-hopping transmitter, which transmits on different predetermined carrier frequencies and which is modulated by the digitized voice data signals from a transmitter data buffer means, and which provides output transmitted signals;

receiver means for receiving the output transmitted signals from the frequency-hopping transmitter;

receiver data buffer means for holding n blocks of digitized voice data from the frequency-hopping receiver;

signal quality estimator means for estimating which of the n blocks of digitized voice data has a desirable signal quality; and means for providing the block of digitized voice data having the desirable signal quality at an output terminal of the system.

3. A frequency-hopping radio communication system for transmitting and receiving digitized voice signals, comprising:

transmitter data buffer means for collecting a block of digitized voice data, where said digitized voice data has a certain bit rate;

transmission means for repeatedly transmitting the same block of digitized voice data n times at n times the certain bit rate where each transmission of the same block of digitized voice data is transmitted on a different carrier frequency, where said transmission means includes a frequency-hopping transmitter, which transmits on different predetermined carrier frequencies and which is modulated by the digitized voice data signals from the transmitter data buffer means, and which provides output transmitted signals;

a transmitter frequency selector means for providing the predetermined carrier frequency signals to the frequency-hopping transmitter;

receiver means for receiving the output transmitted signals from the frequency-hopping transmitter;

a receiver frequency selector means for providing predetermined frequency signals to the frequency-hopping receiver for receiving and demodulating the output transmitted signals from the frequency-hopping transmitter;

multiplexed receiver data buffer means for holding n blocks of digitized voice data from the frequency-hopping receiver;

signal quality estimator means for estimating which of the n blocks of digitized voice data has the best signal quality; and means for providing the block of digitized voice data having the best signal quality at an output terminal of the system.

4. The system of claim 3:

wherein the multiplexed receiver data buffer means includes an input switch having an input terminal and a plurality of output terminals, wherein each output terminal of the input switch means is connected respectively to an input terminal of a data buffer means; and wherein the multiplexed receiver data buffer means includes an output switch having an output terminal and a plurality of input terminals, wherein each input terminal of the output switch means is connected respectively to an output terminal of a data buffer means.

5. The system of claim 3:

wherein the multiplexed receiver data buffer means includes an input switch having an input terminal and two output terminals, wherein each of the two output terminals of the input switch means is connected respectively to an input terminal of a data buffer means; and wherein the multiplexed receiver data buffer means includes an output switch having an output terminal and a two input terminals, wherein each input terminal of the two output switch means is connected respectively to an output terminal of a data buffer means.

6. The system of claim 3 wherein:

the signal quality estimator includes means for determining when the receiver means receives an uncorrupted block of digitized voice data;

means for transmitting each block of digitized voice data as many times as are necessary to provide an acceptable quality for a received block of digitized voice signals as long as the number of retransmissions does not exceed the increase in the channel bit rate; and means for notifying the transmission means to discontinue further retransmissions of the same block of digitized voice data and for the transmission means to remain idle until it is time to transmit the next block of digitized voice signals.

7. The system of claim 3 wherein the signal quality estimator means includes error detection means.

8. The system of claim 7 wherein the error detection means includes parity detection means.

9. The system of claim 3 wherein signal quality estimator means includes means for measuring the quality of a signal received by the receiver means.

10. The system of claim 9 wherein the means for measuring the quality of a signal received by the receiver means includes edge-jitter measuring means.

11. A method of communicating digitized voice signals through a frequency-hopping radio system, comprising the steps of:

increasing the channel bit rate by a factor of n above the bit rate of the original digitized voice data;

redundantly retransmitting a block of digitized voice data at an n times bit rate on multiple sequential frequencies;

holding n blocks of digitized voice data from the frequency-hopping receiver and switchably connecting data buffers to the output terminal of the frequency-hopping receiver;

estimating at a receiver the signal quality of each retransmitted block of digitized voice data; and selecting the retransmitted block having the best quality.

12. A method of communicating digitized voice signals over a frequency hopping communication system, comprising the steps of:

repeatedly transmitting the same block of digitized voice data n times at an increased bit rate over the original rate of the digitized voice data, where each transmission of the same block of digitized voice data is transmitted on a different carrier frequency;

receiving the output transmitted signals from the frequency-hopping transmitter;

holding n blocks of digitized voice data from the frequency-hopping receiver in a receiver data buffer;

estimating which of the n blocks of digitized voice data has a desirable signal quality; and selecting and providing the block of digitized voice data having the desirable signal quality at an output terminal of the system.

13. A method for transmitting and receiving digitized voice signals in a frequency-hopping radio communication system, comprising the steps of:

collecting a block of digitized voice data in a transmitter data buffer, where said digitized voice data has a certain bit rate;

repeatedly transmitting the same block of digitized voice data n times at n times the certain bit rate where each transmission of the same block of digitized voice data is transmitted on a different carrier frequency, where said transmission means includes a frequency-hopping transmitter, which transmits on different predetermined carrier frequencies and which is modulated by the digitized voice data signals from the transmitter data buffer means, and which provides output transmitted signals;

providing the predetermined carrier frequency signals to the frequency-hopping transmitter with a transmitter frequency selector;

receiving the output transmitted signals from the frequency-hopping transmitter with a frequency hopping receiver;

providing predetermined frequency signals to the frequency-hopping receiver for receiving and demodulating the output transmitted signals from the frequency-hopping transmitter with a receiver frequency selector synchronized to the transmitter frequency selector;

holding n blocks of digitized voice data from the frequency-hopping receiver;

estimating which of the n blocks of digitized voice data has the best signal quality; and providing the block of digitized voice data having the best signal quality at an output terminal of the system.

14. The method of claim 13 wherein the step of holding n blocks of digitized voice data from the frequency-hopping receiver includes the step of switchably connecting data buffers to the output terminal of the frequency-hopping receiver.

15. The method of claim 13 wherein the step of holding n blocks of digitized voice data from the frequency-hopping receiver includes the step of switchably connecting one of two data buffers to the output terminal of the frequency hopping receiver and the step of selecting the block of digitized voice data having the best signal quality.

16. The method of claim 13 including the steps of:

determining when the receiver means receives an uncorrupted block of digitized voice data;

transmitting each block of digitized voice data as many times as are necessary to provide an acceptable quality for a received block of digitized voice signals as long as the number of retransmissions does not exceed the increase in the channel bit rate; and notifying the transmission means to discontinue further retransmissions of the same block of digitized voice data and for the transmission means to remain idle until it is time to transmit the next block of digitized voice signals.

17. The method of claim 13 wherein the step of estimating which of the n blocks of digitized voice data has the best signal quality includes detecting errors in a received block of data.

18. The method of claim 17 wherein the step of detecting errors includes detecting parity errors.

19. The method of claim 13 wherein the step estimating includes the step of measuring the quality of a signal received by the receiver means.

20. The method of claim 19 wherein the step of measuring the quality includes measuring edge jitter.

* * * * *